United States Patent
Juppe et al.

(10) Patent No.: US 12,462,515 B2
(45) Date of Patent: Nov. 4, 2025

(54) SYSTEM AND METHOD OF GENERATING A 3D REPRESENTATION OF AN OBJECT

(71) Applicant: APPLICATIONS MOBILES OVERVIEW INC., Montreal (CA)

(72) Inventors: Laurent Juppe, Montreal (CA); Sherif Esmat Omar Abuelwafa, Montreal (CA)

(73) Assignee: APPLICATIONS MOBILES OVERVIEW INC., Montreal (CA)

(*) Notice: Subject to any disclaimer, the term of this patent is extended or adjusted under 35 U.S.C. 154(b) by 0 days.

(21) Appl. No.: 18/541,479

(22) Filed: Dec. 15, 2023

(65) Prior Publication Data

US 2024/0346789 A1    Oct. 17, 2024

Related U.S. Application Data

(63) Continuation of application No. 17/615,146, filed as application No. PCT/IB2020/055118 on May 29, 2020, now abandoned.

(60) Provisional application No. 62/855,451, filed on May 31, 2019, provisional application No. 62/952,193, filed on Dec. 20, 2019.

(51) Int. Cl.
*G06T 19/20* (2011.01)
*G06T 17/00* (2006.01)

(52) U.S. Cl.
CPC .............. *G06T 19/20* (2013.01); *G06T 17/00* (2013.01); *G06T 2210/56* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 8,049,753 B2 * | 11/2011 | Andersson | G06T 15/80 345/426 |
| 8,755,630 B2 | 6/2014 | Hwang et al. | |
| 9,235,928 B2 | 1/2016 | Medioni et al. | |
| 9,747,668 B2 | 8/2017 | Yücer et al. | |
| 9,946,732 B2 | 4/2018 | Maranzana et al. | |
| 10,176,589 B2 | 1/2019 | Taguchi et al. | |

(Continued)

FOREIGN PATENT DOCUMENTS

| | | |
|---|---|---|
| EP | 3996540 A1 | 5/2022 |
| WO | 2021007592 A1 | 1/2021 |
| WO | 2022150252 A1 | 7/2022 |

OTHER PUBLICATIONS

International Search Report and Written Opinion with regard to PCT/IB2020/055118 mailed Aug. 29, 2020.

(Continued)

*Primary Examiner* — Sultana M Zalalee
(74) *Attorney, Agent, or Firm* — BCF LLP

(57) ABSTRACT

The disclosed systems, structures, and methods are directed to generating a three-dimensional (3D) representation of an object, the method comprising accessing a 3D point cloud reconstruction of the object, accessing a 3D model template, the 3D model template defining a generic version of the object, aligning, in a geometrical space, the 3D model template with respect to the 3D point cloud reconstruction, adjusting a scale of the 3D model template, and applying local deformations to a surface of the 3D model template.

18 Claims, 20 Drawing Sheets

(56) References Cited

U.S. PATENT DOCUMENTS

| | | | |
|---|---|---|---|
| 10,621,791 | B2 | 4/2020 | Yen et al. |
| 10,796,497 | B2 | 10/2020 | Santhanam et al. |
| 10,930,069 | B1 | 2/2021 | Jackson et al. |
| 10,977,481 | B2 | 4/2021 | Meany et al. |
| 11,257,289 | B2 | 2/2022 | Venkataraman |
| 11,321,918 | B2 | 5/2022 | Jørgensen et al. |
| 11,423,630 | B1 | 8/2022 | Agrawal et al. |
| 2009/0051683 | A1* | 2/2009 | Goonetilleke ......... A43D 1/025 348/207.1 |
| 2010/0111370 | A1 | 5/2010 | Black et al. |
| 2013/0155058 | A1* | 6/2013 | Golparvar-Fard ............ G06Q 10/06311 345/419 |
| 2014/0043329 | A1 | 2/2014 | Wang et al. |
| 2015/0213646 | A1* | 7/2015 | Ma ............... G06T 7/50 345/420 |
| 2016/0148425 | A1 | 5/2016 | Hwang et al. |
| 2016/0163104 | A1* | 6/2016 | Hou ............ G06T 5/77 345/520 |
| 2016/0379419 | A1 | 12/2016 | Khalili et al. |
| 2017/0193699 | A1 | 7/2017 | Mehr et al. |
| 2017/0272728 | A1* | 9/2017 | Rafii ............ G06Q 30/0631 |
| 2018/0218507 | A1 | 8/2018 | Hyllus et al. |
| 2018/0318014 | A1 | 11/2018 | Gangwar et al. |
| 2019/0028637 | A1* | 1/2019 | Kolesov ............ G06T 7/73 |
| 2019/0035149 | A1 | 1/2019 | Chen et al. |
| 2019/0108677 | A1 | 4/2019 | Blondel et al. |
| 2019/0266796 | A1 | 8/2019 | Comer |
| 2019/0294743 | A1 | 9/2019 | Ajri et al. |
| 2020/0000180 | A1* | 1/2020 | Sherrah ............ A43D 1/025 |
| 2020/0005537 | A1 | 1/2020 | Inagaki et al. |
| 2020/0020118 | A1 | 1/2020 | Chapdelaine-Couture et al. |
| 2020/0160616 | A1 | 5/2020 | Li et al. |
| 2020/0226786 | A1 | 7/2020 | Fitzgibbon et al. |
| 2020/0242331 | A1 | 7/2020 | Song et al. |
| 2021/0103776 | A1 | 4/2021 | Jiang et al. |
| 2021/0142556 | A1 | 5/2021 | Vachaparampil et al. |
| 2021/0275925 | A1 | 9/2021 | Kolen et al. |
| 2022/0068024 | A1 | 3/2022 | Lin et al. |

OTHER PUBLICATIONS

Basri et al., "The Alignment of Objects With Smooth Surfaces: Error Analysis of the Curvature Method", Proceedings / CVPR, IEEE Computer Society Conference on Computer Vision and Pattern Recognition. IEEE Computer Society Conference on Computer Vision and Pattern Recognition, Jul. 1992, 21 pages.

Besl et al., "Method for Registration of 3-D Shapes", IEEE Transactions on Pattern Analysis and Machine Intelligence, vol. 14, No. 2, Feb. 1992, pp. 239-256.

Elhabian et al., "A Tutorial on Rigid Registration: Iterative Closed Point (ICP)", University of Louisville, CVIP Lab, Mar. 2009, 130 pages.

Bookstein, "Principal Warps: Thin-Plate Splines and the Decomposition of Deformations", IEEE Transactions on Pattern Analysis and Machine Intelligence, vol. 11, No. 6, Jun. 1989, pp. 567-585.

Wang et al., "Surface Reconstruction Using Deformable Models with Interior and Boundary Constraints", IEEE, Proceedings Third International Conference on Computer Vision, 1990, https://ieeexplore.ieee.org/document/139536, pp. 300-303.

Feng, "Method to automatically register scattered point clouds based on principal pose estimation." Optical Engineering 56.4 (2017), 11 pages.

* cited by examiner

SYSTEM AND METHOD OF GENERATING A 3D REPRESENTATION OF AN OBJECT

CROSS-REFERENCE TO RELATED APPLICATIONS

This application is a Continuation of U.S. patent application Ser. No. 17/615,146, entitled "SYSTEM AND METHOD OF GENERATING A 3D REPRESENTATION OF AN OBJECT", filed on Nov. 30, 2021, which is a National Stage of International Application No. PCT/IB2020/055118 entitled "SYSTEM AND METHOD OF GENERATING A 3D REPRESENTATION OF AN OBJECT", filed on May 29, 2020, which claims priority to U.S. Provisional Application No. 62/952,193, entitled "SYSTEM AND METHOD OF GENERATING A 3D REPRESENTATION OF AN OBJECT", filed on Dec. 20, 2019, and also claims priority to U.S. Provisional Patent Application Ser. No. 62/855,451, "SYSTEM AND METHOD OF GENERATING A 3D REPRESENTATION OF AN OBJECT", filed on May 31, 2019, the contents of which are incorporated herein by reference in jurisdictions allowing such incorporation.

FIELD

The present technology relates to systems and methods of generating a 3D representation of an object.

BACKGROUND

Three-dimensional ("3D") digital data may be produced by a variety of devices that involve three-dimensional scanning or sampling and/or numerical modeling. In one example, 3D laser scanners generate 3D digital data. A long range laser scanner is fixed in one location and rotated to scan objects around it. Alternatively, a short-range laser scanner is mounted on a device that moves around an object while scanning it. In any of the scenarios, the location of each point scanned is represented as a polar coordinate since the angle between the scanner and the object and distance from the scanner to the object are known. The polar coordinates are then converted to 3D Cartesian coordinates and stored along with a corresponding intensity or color value for the data point collected by the scanner.

Other examples to generate 3D digital data are depth cameras or 3D scanner to generate 3D digital data by collecting a complete point set of (x, y, z) locations that represent the shape of an object. Once collected, these point sets, also known as 3D point clouds, are sent to an image rendering system, which then processes the point data to generate a 3D representation of the object.

Typical systems and methods to capture 3D point clouds and then generate 3D representation of the object require specialized, cumbersome and costly hardware equipment. To this end, there is an interest in developing cost effective systems and methods to generate 3D representation from 3D point clouds.

SUMMARY

Embodiments of the present technology have been developed based on developers' appreciation of at least one technical problem associated with the prior art solutions.

For example, even though the prior art suggest techniques to generate 3D point clouds and then from the 3D point clouds generating a 3D representation of the object. However, such techniques require specialized, cumbersome and costly hardware equipment such as 3D laser scanners. Moreover, efficient generation of 3D representation of the object from the 3D point clouds is still a pending concern.

In developing the present technology, developers noted that non-specialized hardware, such as a mobile device comprising a camera (e.g., an iPhone® from Apple or a Galaxy® from Samsung) may be used to conduct an acquisition of a 3D point cloud reconstruction. The 3D point cloud reconstruction may then be used in combination with a 3D model template to generate a 3D representation of the object.

In accordance with a first broad aspect of the present technology, there is provided a method of generating a three-dimensional (3D) representation of an object, the method comprising accessing a 3D point cloud reconstruction of the object, accessing a 3D model template, the 3D model template defining a generic version of the object, aligning, in a geometrical space, the 3D model template with respect to the 3D point cloud reconstruction, adjusting a scale of the 3D model template, and applying local deformations to a surface of the 3D model template.

In some embodiments of the method, wherein accessing the 3D point cloud reconstruction of the object comprises applying a denoising routine.

In some embodiments of the method, wherein accessing the 3D model template is performed in accordance with a selection routine.

In some embodiments of the method, wherein the 3D model template is a 3D mesh model.

In some embodiments of the method, wherein the geometrical space is associated with a cartesian coordinate system and/or a cylindrical coordinate system and/or a spherical coordinate system.

In some embodiments of the method, wherein aligning the 3D model template with respect to the 3D point cloud reconstruction comprises applying a rotation and/or a translation.

In some embodiments of the method, wherein aligning the 3D model template with respect to the 3D point cloud reconstruction comprises (i) aligning, in translation, a first center of gravity associated with the 3D model template and a second center of gravity associated with the 3D point cloud reconstruction, and (ii) aligning, in rotation, the 3D model template with respect to the 3D point cloud reconstruction is based on at least one of a minimum distance between the 3D model template and the 3D point cloud reconstruction, Principal Components Analysis, and/or 2D projections alignments.

In some embodiments of the method, wherein aligning, in rotation, the 3D model template with respect to the 3D point cloud reconstruction based on Principal Components Analysis comprises identifying 3 main axis of the 3D model template to align the 3 main axis with the axis of the 3D point cloud reconstruction.

In some embodiments of the method, wherein aligning, in rotation, the 3D model template with respect to the 3D point cloud reconstruction based on 2D projections alignments comprises computing 2D pictures from the 3D model template in a combination of different points of view and match the 2D pictures to match the points of views.

In some embodiments of the method, wherein adjusting the scale of the 3D model comprises executing an iterative closest point (ICP) algorithm.

In some embodiments of the method, wherein adjusting the scale of the 3D model is performed iteratively and comprises one of (1) modifying a scale of the 3D model template, (2) applying/refining a rotation to the 3D model template and/or (3) applying/refining a translation to the 3D model template, calculating a distance between the 3D model template and the 3D point cloud reconstruction, and wherein the iterating stops based on a calculated minimum distance.

In some embodiments of the method, applying local deformations to the surface of the 3D model template comprises determining, for at least some of the points of the 3D model template, normal axis extending from each of the at least some of the points of the 3D model template, displacing the at least some of the points of the 3D model template along corresponding normal axis of a computed amplitude, the displacing further comprising displacing neighboring points located within a radius of the at least some of the points of the 3D model template.

In some embodiments of the method, wherein the computed amplitude is based on a scalar product of a normalized normal vector to the at least some of the points of the 3D model template and a vector linking a point to be displaced in the 3D model template and a centroid in the 3D point cloud reconstruction.

In some embodiments, the method further comprises generating at least two 3D representations of at least two objects and combining the at least two 3D representations.

In some embodiments, the method further comprises identifying low quality deformations, selecting parts to be corrected, correcting the parts.

In some embodiments of the method, wherein low quality deformations are identified by operating a quality function.

In some embodiments of the method, wherein selecting parts to be corrected is based on distances distribution and/or angles distribution between the 3D model template and a deformed 3D model template.

In some embodiments of the method, wherein applying the local deformations to the surface of the 3D model template comprises computing a quality level of the local deformations, and correcting the local deformations based on the computed quality level.

In some embodiments of the method, wherein the correcting the local deformations based on the computed quality level further comprises correcting the local deformations if a computed quality level is below a threshold.

In accordance with a second broad aspect of the present technology, there is provided a system for generating a three-dimensional (3D) representation of an object, the system comprising a processor, a non-transitory computer-readable medium comprising instructions, the processor, upon executing the instructions, being configured to cause the processor to access a 3D point cloud reconstruction of the object, access a 3D model template, the 3D model template defining a generic version of the object, align, in a geometrical space, the 3D model template with respect to the 3D point cloud reconstruction, adjust a scale of the 3D model template, and apply local deformations to a surface of the 3D model template.

BRIEF DESCRIPTION OF THE DRAWINGS

These and other features, aspects and advantages of the present technology will become better understood with regard to the following description, appended claims and accompanying drawings where:

DETAILED DESCRIPTION OF THE DRAWINGS

Figure 1:
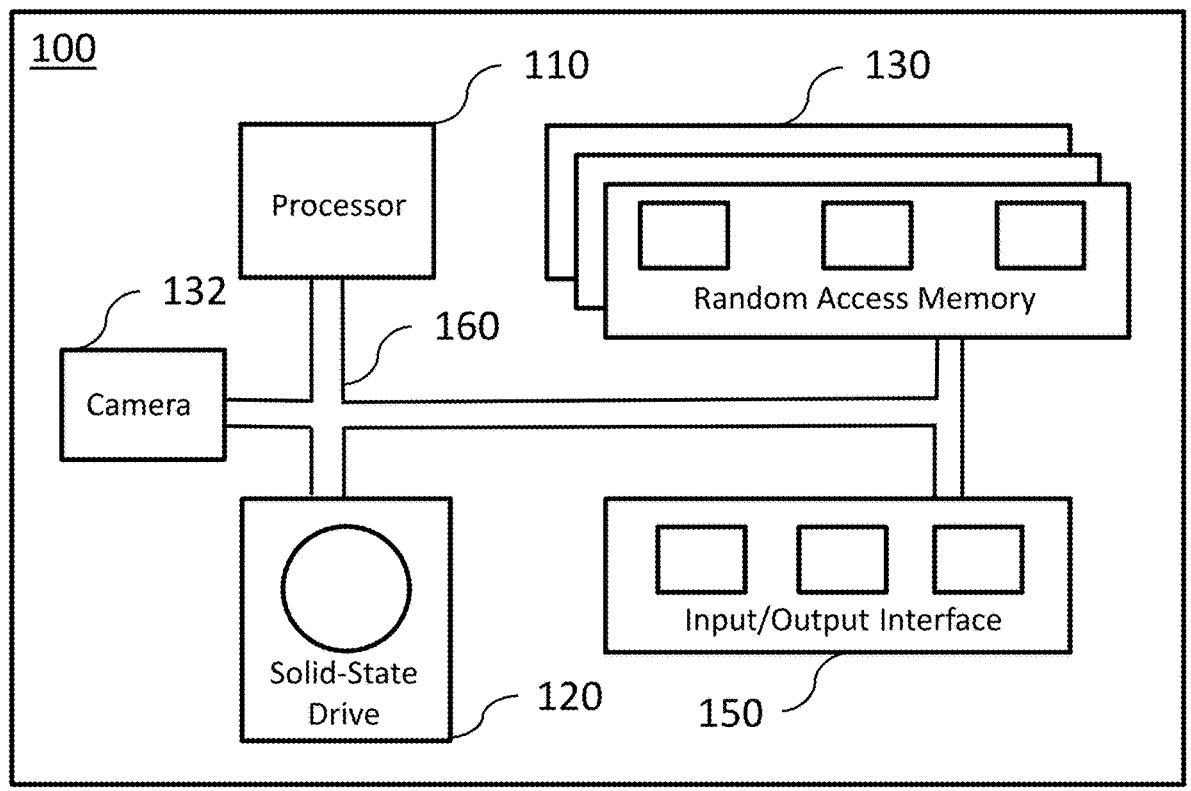
FIG. 1 is an illustration of an exemplary environment for executing a method of generating a 3D representation of an object.

Various exemplary embodiments of the described technology will be described more fully hereinafter with reference to the accompanying drawings, in which exemplary embodiments are shown. The present inventive concept may, however, be embodied in many different forms and should not be construed as limited to the exemplary embodiments set forth herein. Rather, these exemplary embodiments are provided so that the disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular exemplary embodiments and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

Figure 2:
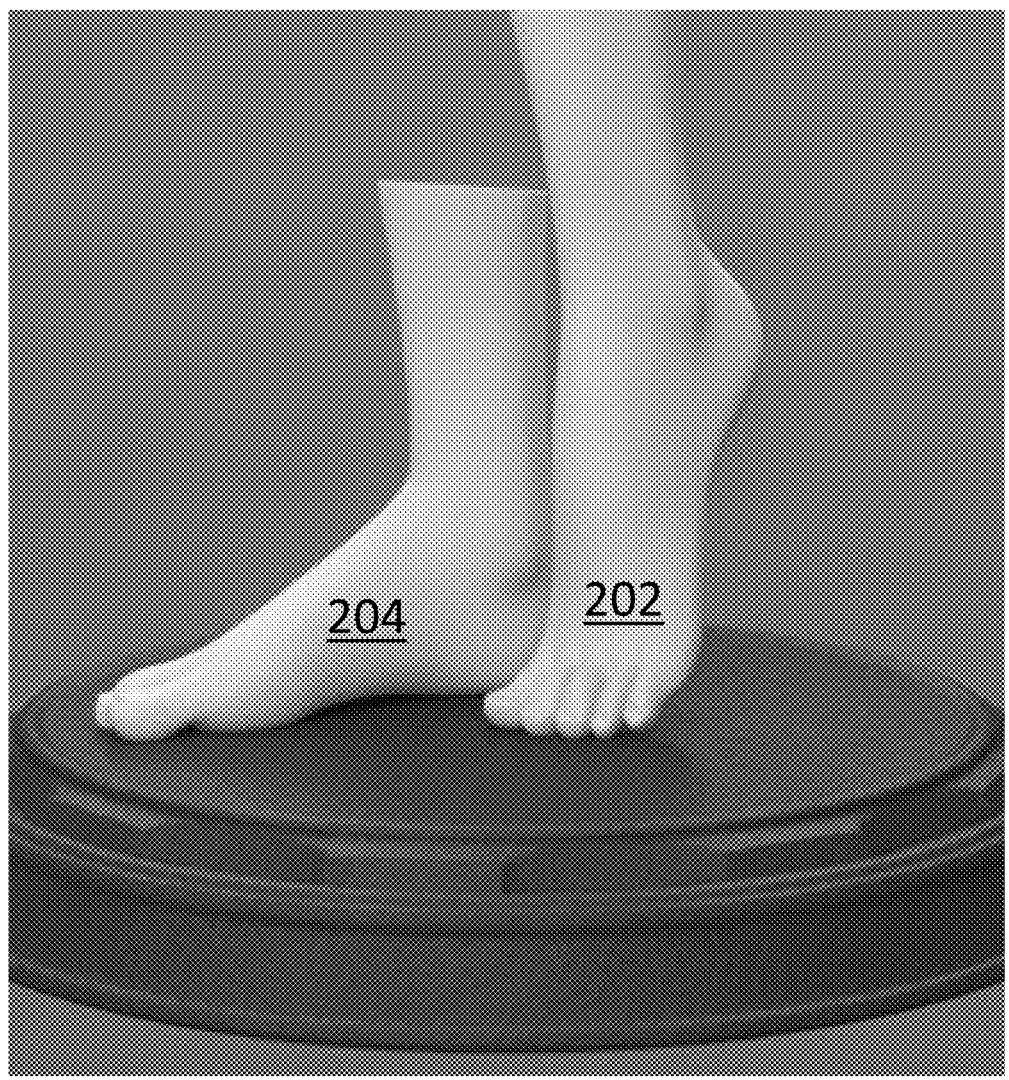
FIG. 2 is an illustration of an exemplary embodiment of a 3D representation of an object.

In the context of the present technology, a "3D representation of an object" may refer to a digital 3D model of this object under the form of a digital file or a digital group of files that describe the 3D geometry of an object. The description of an object's 3D geometry is given in terms of a collection of points in a 3D space (hereafter called "vertices", singular: "vertex"), those vertices being connected or not by various geometry entities such as triangles lines, planar or curved surface, etc. 3D models can be created by hand, algorithmically or scanned. Other information related to the 3D representation of the model such as colors, textures, materials, shaders, etc. can be stored in complementary files that will be associated to the main file describing the geometry of the object. This is why a 3D model can be made of a "group of files". Typically, a wooden aspect will be given by a separate picture of a wood texture that will be linked to the geometry. In the present disclosure, we will use both scanned and handcrafted 3D models. The format of those digital files are numerous and the invention is compatible to the most common ones. Examples of 3D representations of objects are illustrated at FIG. 2 in which 3D representations of human feet 202 and 204 are depicted.

Figure 3:
FIGS. 3 and 4 are illustrations of exemplary embodiments of 3D point cloud reconstructions.
Figure 4:
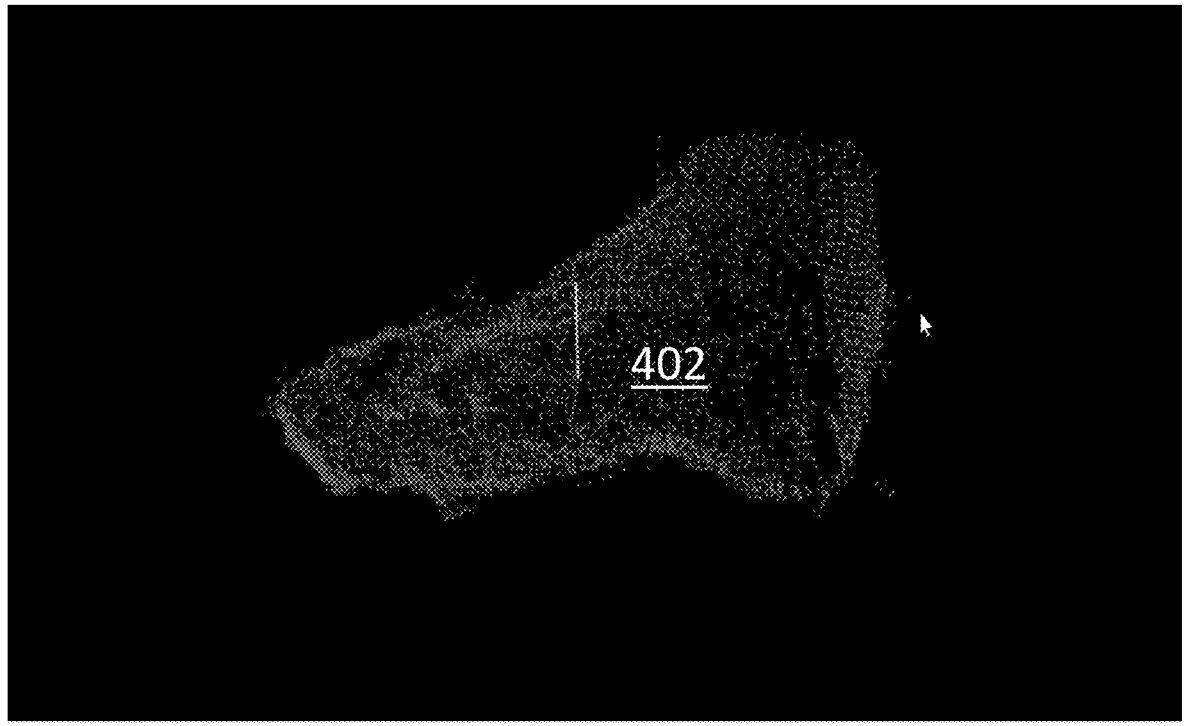

In the context of the present technology, a "3D point cloud reconstruction" may refer to a simple 3D representation of an object were the vertices are not necessarily connected to each other. If they are not connected to each other, the only information contained in this kind of representation is the coordinates (e.g., x, y, z in the case of a cartesian coordinate system) of each vertex, and its color (e.g., r, g, b). The 3D point cloud reconstruction is often used as the result of a 3D scanning and a very common format for those files is the Polygon File Format (PLY). 3D point cloud reconstructions are typically simple 3D representations which are usually rough and barely used directly by most users as they typically do not allow a realistic representation of the object but rather a set of 3D points without any relations with each other besides their position and color. A first example of a 3D point cloud reconstruction is illustrated at FIG. 3 in which a 3D point cloud reconstruction of a human foot 302 is depicted. A second example of a 3D point cloud reconstruction is illustrated at FIG. 4 in which a 3D point cloud reconstruction of a human foot 402 is depicted.

Figure 5:
FIG. 5 is an illustration of an exemplary embodiment of a 3D model template.

In the context of the present technology, a "3D model template" may refer to a complex 3D representation of an object were vertices are connected together to form faces that will build the whole and complete surface of a 3D object. It is thus typically realistic and customizable. The present disclosure refers to a "3D model template" to better illustrate aspects of the present technology allowing to modify a complex 3D representation of a model to match simple 3D representation (3D "point clouds") of this same object. Indeed, point clouds are easier to make from a connection to a real object (through a scanner or a set of pictures) than complex 3D models. Aspects of the present technology relates to deforming a complex 3D model (3D morphing) with all its parameters in such a way that it fits to reality (point clouds). Reference is made to "template" as, in some embodiments of the present technology, the "3D model template" defines a generic version of an object or of a class of objects. As non-limiting examples, 3D model templates may be a generic human foot, a generic body part, a generic body, a generic part or component of machinery. An example of a 3D model template is illustrated at FIG. 5 in which a 3D model template of a human foot 502 is depicted.

The present disclosure illustrates embodiments of the technology focusing on the 3D reconstruction of a human foot for the purpose of efficiently and easily generate 3D reconstructions without requiring specialized equipment such as dedicated medical scanners. As a result, non-specialized hardware, such as a mobile device comprising a camera (e.g., an iPhone® from Apple or a Galaxy® from Samsung) may be used to conduct an acquisition of a 3D point cloud reconstruction. The 3D point cloud reconstruction may then be used in combination with a 3D model template to generate a 3D representation in accordance with the present technology.

The present technology may therefore provide a cost-efficient approach to the problem of generating accurate 3D representation of object which would have otherwise required specialized, cumbersome and costly hardware equipment. The present technology may for example be suitable for the generation of accurate 3D representation of human feet which may then be used for the manufacturing of customized medical devices, such as, but without being limitative, orthoses.

Even though the present technology is presented in the context of generating highly reliable 3D representations of human feet from 3D point cloud reconstructions and 3D models, it should be understood that this aspect is not limitative. To the contrary, the present technology may be applied to the generation of 3D representations of any objects. As a non-limitative example, the present technology may be applied to the generation of 3D representations of a complete body or of one or more body parts. Such 3D representations of a body or of one or more body parts may then be used for different applications, such as, but without being limitative, an assessment of physical conditions, recommendations for the purpose of physical training and/or for the purpose of suggesting a diet based on the physical conditions extrapolated from the 3D representations of the one or more body parts.

As another non-limitative example, the present technology may be applied to the generation of 3D representations of mechanical parts from pictures or video sequences, for example in the context of generating 3D representations of parts and/or components of machinery (e.g., parts of an aircraft, parts of an engine, etc.). Such 3D representations, once generated, may be used to populate and/or complete a database of 3D objects, such as a computer aided design (CAD) database. Other variations of objects or applications may also be envisioned without departing from the scope of the present technology.

With these fundamentals in place, we will now consider some non-limiting examples to illustrate various implementations of aspects of the present technology.

FIG. 1 illustrates a diagram of a computing environment 100 in accordance with an embodiment of the present technology is shown. In some embodiments, the computing environment 100 may be implemented by any of a conventional personal computer, a computer dedicated to operating generation of 3D representation of objects, a remote server and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random access memory 130, a camera 132 and an input/output interface 150. The computing environment 100 may be a computer specifically designed for operating generation of 3D representation of objects. In some alternative embodiments, the computing environment 100 may be a generic computer system.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. In some embodiments, the computing environment 100 is virtualized in the "cloud" so that processing power and/or memory capacity may be scaled up or down depending on actual needs for executing implementations of the present technology. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110 for executing generation of 3D representation of objects. For example, the program instructions may be part of a library or an application.

Figure 6:
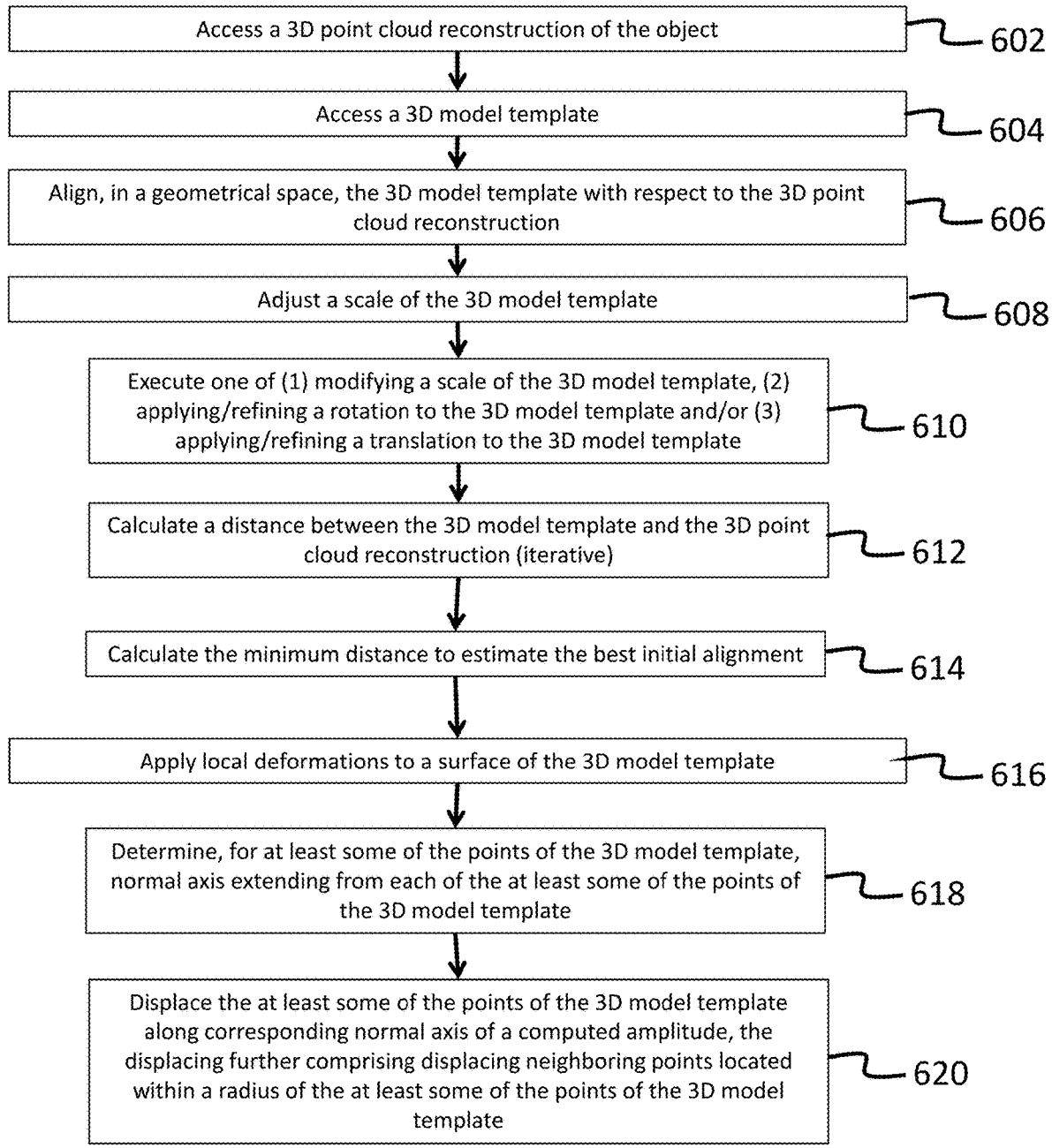
FIG. 6 is an illustration of a method carried out in accordance with non-limiting embodiments of the present technology.

Referring now concurrently to FIG. 6 and FIG. 7-15, some non-limiting example instances of systems and computer-implemented methods used in connection with generating a 3D representation of an object shall now be described. More specifically, FIG. 6 shows flowcharts illustrating a computer-implemented method 600 implementing embodiments of the present technology. The computer-implemented method of FIG. 6 may comprise a computer-implemented method executable by a processor of a computing environment, such as the computing environment 100 of FIG. 1, the method comprising a series of steps to be carried out by the computing environment.

The computer-implemented method of FIG. 6 may be carried out, for example, by a processor executing program instructions having been loaded, for example, into random access memories.

The method 600 starts at step 602 by accessing a 3D point cloud reconstruction of the object. As it may be appreciated, the 3D point cloud reconstruction of the object may be accessed from a memory storing one or more 3D point cloud reconstructions of objects previously acquired through various methodologies which will become apparent to the person skilled in the art of the present technology. In some embodiments, the 3D point cloud reconstruction of the object may have been generated from images or a video sequence depicting the object and captured through the camera of the device on which the method 600 is executed (e.g., the camera 132 of the device 100). The images or the video sequence may be acquired by a camera embedded in a mobile device. In such instances, the images or the video sequence may be subjected to one or more post-processing methods which allow generating point clouds from raw images or video sequences. In some embodiments, the 3D point cloud reconstruction may be subjected to a denoising routine allowing to increase an accuracy of the points defining the 3D point cloud reconstruction and/or reduce a number of points which do not relate to the object itself. The object represented in the context of the present disclosure is a human foot. As previously mentioned, this aspect is not limitative, the present technology may equally be applicable to other objects (e.g., body parts, body, parts or components of machinery, etc).

At a step 604, the method 600 proceeds to accessing a 3D model template which defines a generic version of the object. In some embodiments, the 3D model template may accessed from a database of 3D models. A selection routine may be applied to select the one or more 3D models which are deemed to be the most suitable for the particular context in which the 3D reconstruction is to be generated. In the illustrated example, the 3D model is a high resolution 3D mesh of a human foot, for example the 3D model 502 of FIG. 5. In some embodiments, the selection routine may determine the context based on an analysis of the 3D point cloud reconstruction accessed at step 602. Other approaches may equally be envisioned.

In some embodiments, the 3D model template which is a 3D mesh model may be used as a 3D point cloud model. In some embodiments, the 3D point cloud model may be created from the 3D mesh model.

At a step 606, the method 600 proceeds to aligning, in a geometrical space, the 3D model template with respect to the 3D point cloud reconstruction. In some embodiments, the geometrical space is associated with a cartesian coordinate system and/or a cylindrical coordinate system and/or a spherical coordinate system. In some embodiments, aligning the 3D model template with respect to the 3D point cloud reconstruction comprises applying a translation and/or a rotation. The translation may comprise aligning, in translation, a first center of gravity associated with the 3D model template and a second center of gravity associated with the 3D point cloud reconstruction. The rotation may comprise aligning, in rotation, the 3D model template with respect to the 3D point cloud reconstruction based on a minimum distance between the 3D model template and the 3D point cloud reconstruction. In some embodiments, the rotation alignment may be a combination of several approaches applied separately or combined together until a best initial rotation alignment is performed.

Figure 7:
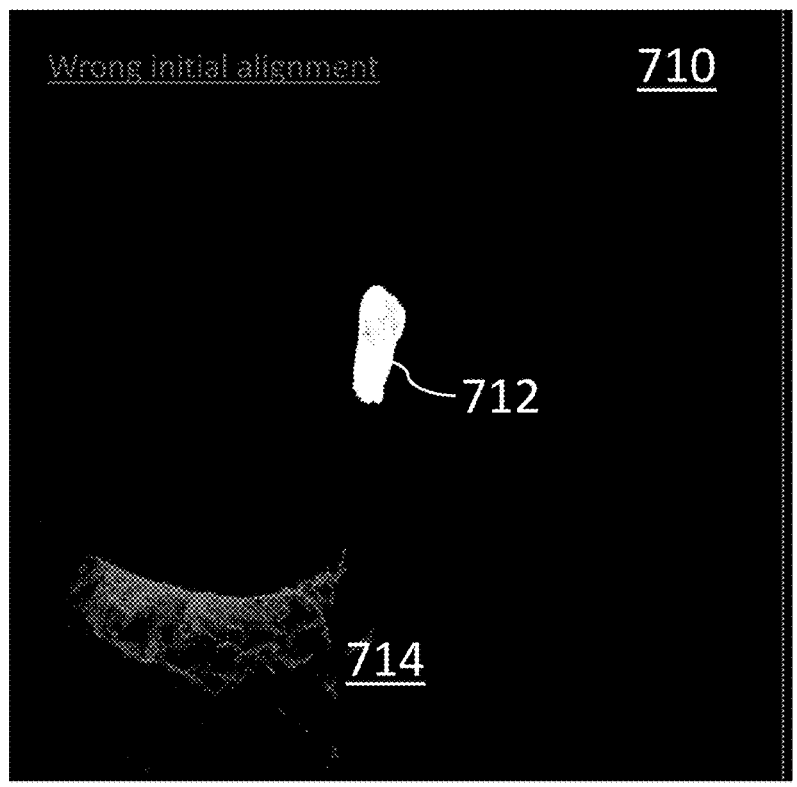
FIG. 7 illustrates examples of initial alignments in accordance with embodiments of the present technology.
Figure 7:
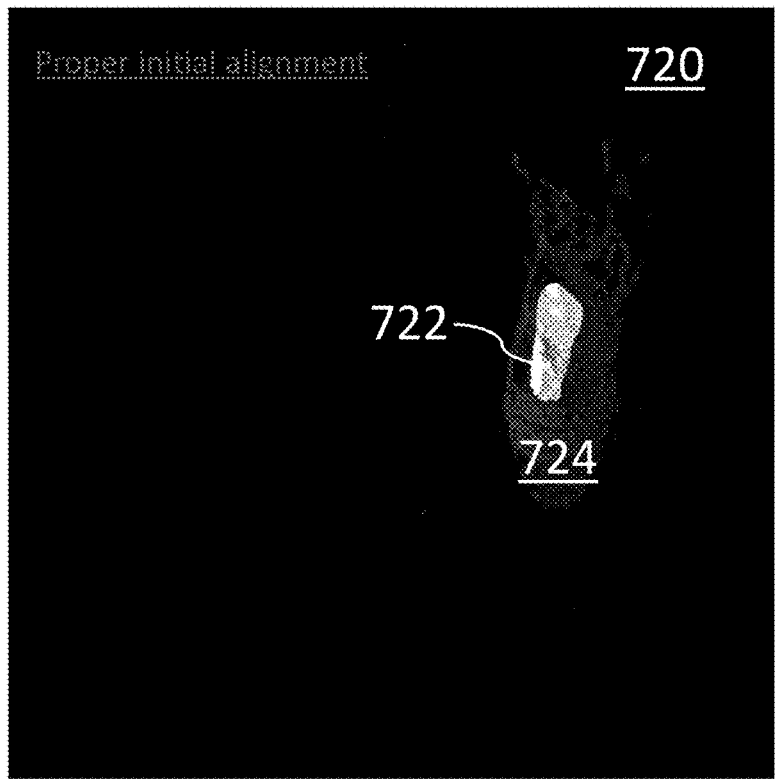

A first example of such alignment approach may be a method based on principal component analysis (PCA). Such method may allow identifying among other parameters 3 main axis of the 3D model so that the 3 main axis may be aligned with the axis of the 3D point cloud reconstruction using, for example, the method of minimum distances. Each distance is computed for each combination of axis alignments and the lowest distance may lead to the correct alignment. FIG. 7 illustrates a first example of a wrong initial alignment 710 wherein a 3D model 712 is not properly aligned with a 3D point cloud reconstruction 714. FIG. 7 also illustrates a second example of a proper initial alignment 720 wherein a 3D model 722 is properly aligned with a 3D point cloud reconstruction 724.

Figure 8:
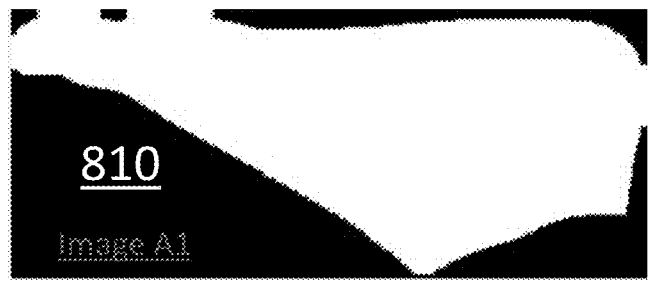
FIG. 8 illustrates examples of an alternative alignment routine in accordance with embodiments of the present technology.
Figure 8:
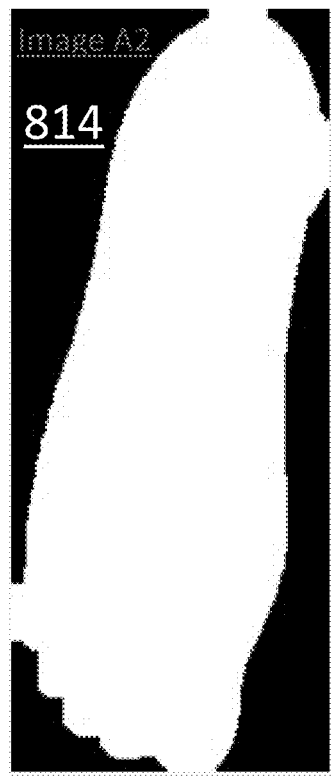
Figure 8:
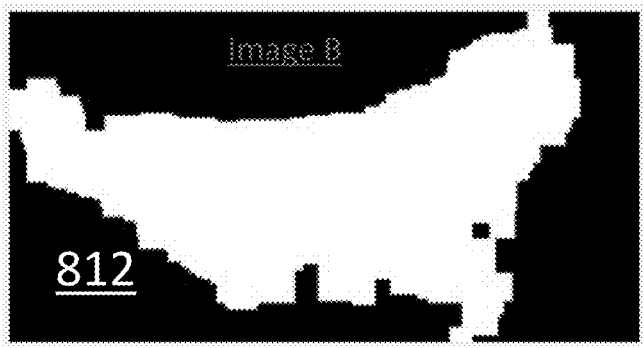

A second example of such alignment approach may be a method based on 2D masks projections alignment. Such method may consist in computing 2D pictures from the 3D model in a combination of different points of view and to match the pictures to match the points of views. It allows determining the alignment of the 3 axis of the 3D model with the 3 axis of the 3D point cloud reconstruction. FIG. 8 illustrates an example wherein images 810 and 812 are view from a similar view point and wherein images 812 and 814 are viewed from a different view point (and therefore do not provide a match).

At a step 608, the method 600 proceeds to adjusting a scale of the 3D model template. In some embodiments, the adjusting of the 3D model comprises executing an iterative closest point (ICP) algorithm. In some embodiments, the adjusting comprises iteratively executing sub-steps 610 and 612. In some embodiments, sub-step 610 comprises modifying a scale of the 3D model template, applying/refining a rotation to the 3D model template and/or applying/refining a translation to the 3D model template. In some embodiments, sub-step 612 comprises calculating a distance between the 3D model template and the 3D point cloud reconstruction. In some embodiments, the calculated distance may be one of the closest point and the point to normal distance.

In some embodiments, determination that iteration of sub-steps 610 and 612 is to be stopped (and that the best initial alignment is found) is based on the calculated minimum distance at a step 614.

Figure 9:
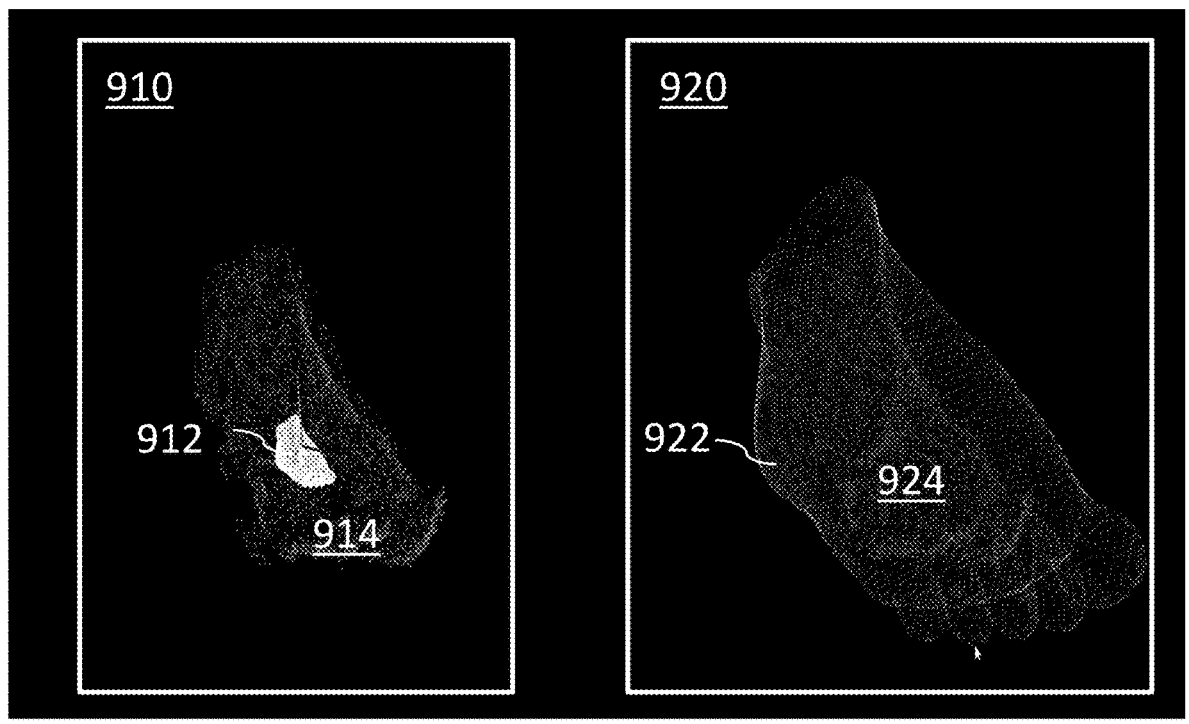
FIG. 9 illustrates an example of adjusting a scale of the 3D model template in accordance with embodiments of the present technology.
Figure 10:
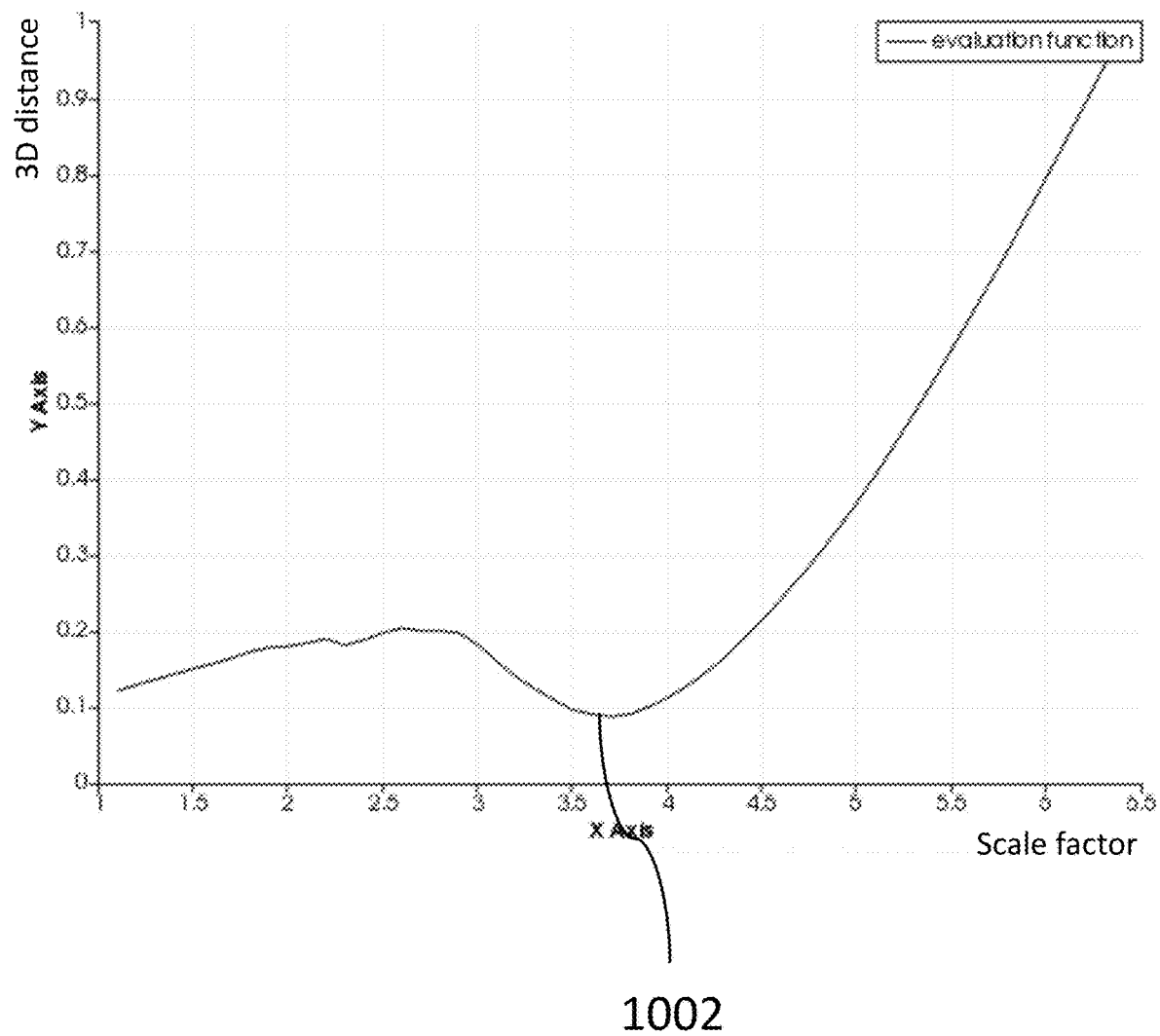
FIG. 10 illustrates evolution of a calculated minimum distance with respect to various scale values in accordance with embodiments of the present technology.

FIG. 9 illustrates an example of adjusting a scale of the 3D model template in accordance with step 608. In the illustrated example, a first representation 910 illustrates a 3D model 912 associated with a first scale and aligned with a 3D point cloud reconstruction 914. A second representation 920 illustrates a 3D model 922 associated with a second scale and aligned with a 3D point cloud reconstruction 924. As can be seen in the second representation 920, the 3D model 922 is over scaled, so as to ensure that an appropriate (or best) scale value is found. FIG. 10 illustrates evolution of the calculated minimum distance with respect to various scale values. In the illustration of FIG. 10, the appropriate scale value is determined to be the one associated with the minimum distance between the 3D model and the 3D point cloud reconstruction (i.e., a point 1002 on the curve).

It should be noted that besides having a metric reference in the scene being shot, another way to calculate an absolute metric may be to use a gyroscope and an accelerometer if the device 210 is equipped with those. With combined data provided by accelerometers and/or gyroscopes now embedded in most portable devices, it is possible, without any measure information in the 2D pictures, to calculate with sufficient accuracy, the size and measures (2D and/or 3D) of the 3D reconstructed objects. Absolute 2D dimensions may be provided with a precision of less than 5% of error, which is usable from the user's point of view. 3D volumes may be computed with only one 2D measurement information (length, height, depth and/or width . . . ).

Figure 11:
FIG. 11 illustrates two examples of 3D point cloud reconstructions in accordance with embodiments of the present technology.
Figure 11:
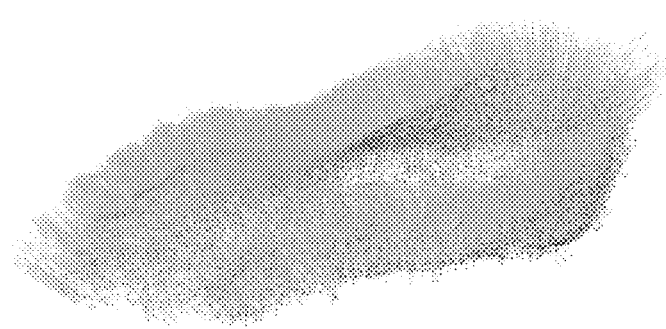

At a step 616, the method 600 proceeds to applying local deformations to a surface of the 3D model template. In some embodiments, the step 616 comprises sub-steps 618 and 620. The step 618 comprises determining, for at least some of the points of the 3D model template, normal axis extending from each of the at least some of the points of the 3D model template. FIG. 11 illustrates two examples of 3D point cloud reconstructions 1102 and 1104. The 3D point cloud reconstruction 1104 is illustrated with normals projecting from points.

Figure 12:
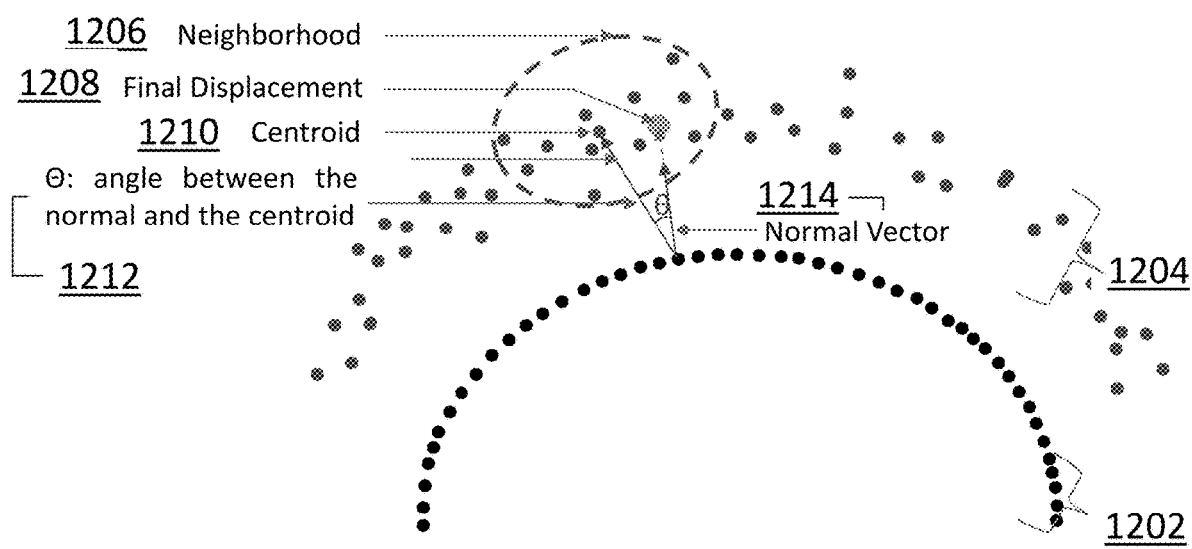
FIG. 12 illustrates vertices from a 3D model template and points from a 3D point cloud reconstruction in accordance with embodiments of the present technology.

The step 620 comprises displacing at least some of the points (also referred to as "vertex" or "vertices") of the 3D model template along corresponding normal axis of a computed amplitude. In some embodiments, the displacing further comprises displacing neighboring points located within a radius of the at least some of the points of the 3D model template. FIG. 12 illustrates vertices 1202 from a 3D model template and points 1204 from a 3D point cloud reconstruction. In some embodiments, for each vertex of the 3D model template, a collection of "several" closest points 1206 in the reconstructed model is determined. In some embodiments, the "several" closest points are based on the 3D models resolution. In some embodiments, the "several" closest points may be chosen in a restricted neighborhood 1206 around the normal vector 1214, at the 3D point cloud reconstruction. In some embodiments, centroid 1210 of the "several" vertices is computed in 3D. In some embodiments, an amplitude of displacement of the at least some of the points of the 3D template model and the neighboring points is based on a scalar product of the normalized normal vector (length=1) and the vector linking the vertex to be displaced in the 3D model template and the centroid 1210 in the 3D point cloud reconstruction, in accordance with the following formula:

$$NormalVectorLength \times PointToCentroidVectorLength \times \cos(AngleBetweenThoseTwoVectors)$$

θ 1212 defines an angle between the normal and the centroid 1210. The value of this angle may be either unconstrained or constrained. In one example, the final displacement of a point in vertices 1202 is represented by 1208.

Figure 13:
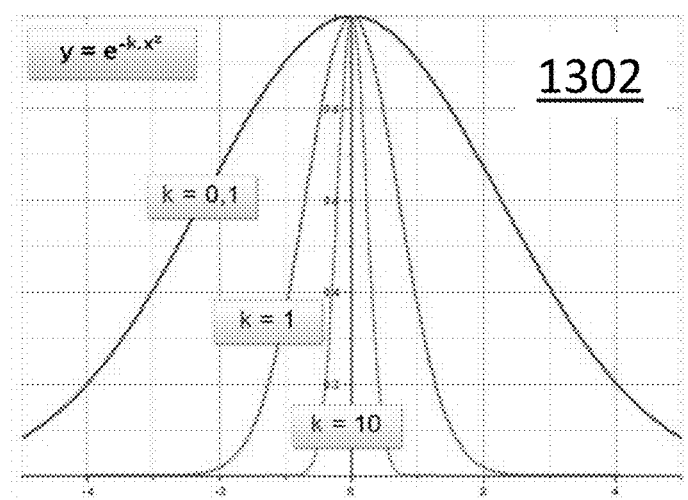
FIG. 13 illustrates a "bell" function and scenarios of displacements of vertices in accordance with embodiments of the present technology.
Figure 13:
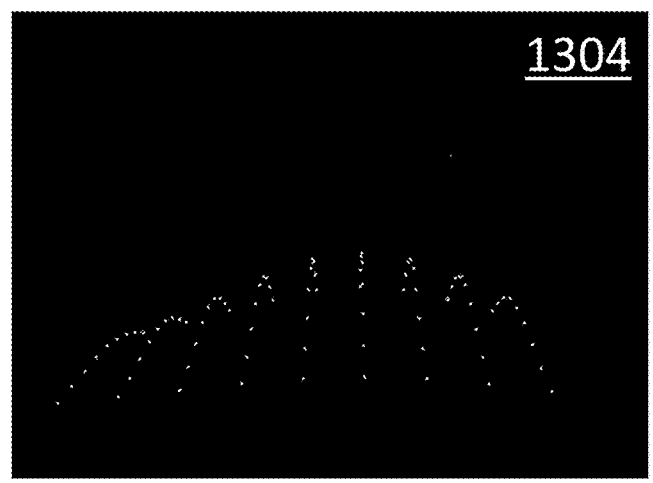
Figure 13:
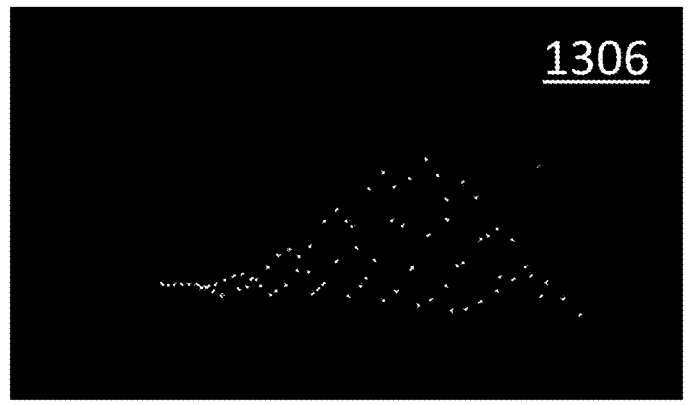

In some embodiments, the displacement of the at least some of the points of the 3D model template influences its neighbors according to a "bell" function so that the overall displacement of the 3D model template preserves the smoothness of the 3D shape. FIG. 13 illustrates the "bell" function at 1302 and scenarios 1304 and 1306 of displacements of the vertices.

Figure 14:
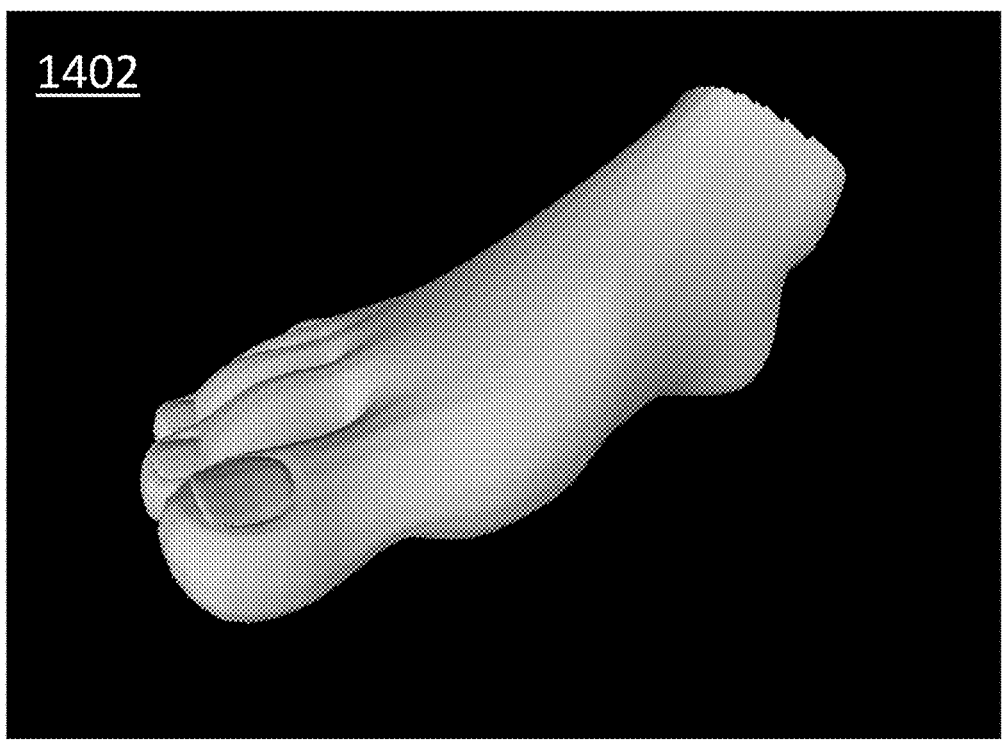
FIG. 14 illustrates a first 3D model template before and after morphing in accordance with embodiments of the present technology.
Figure 14:
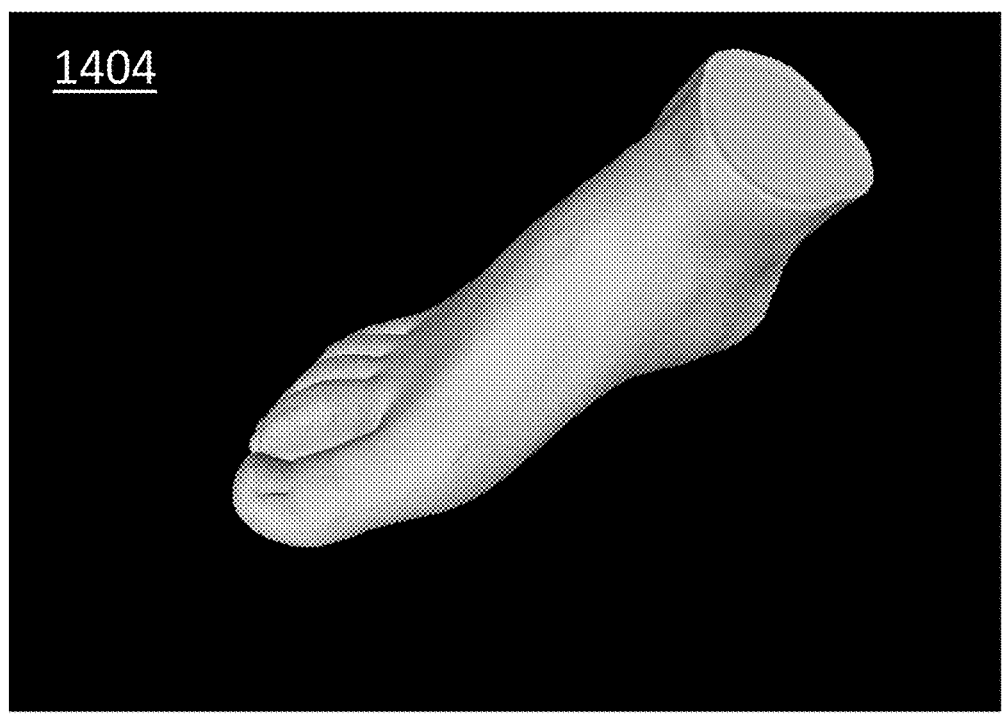

FIG. 14 illustrates a first example of a first 3D model template in a first version 1402, prior to being morphed in accordance with the method 600. FIG. 14 also illustrates the first 3D model template in a second version 1404, after having been morphed and defining a first 3D representation of the foot captured by a 3D point cloud representation, in accordance with the method 600.

Figure 15:
FIG. 15 illustrates a second 3D model template before and after morphing in accordance with embodiments of the present technology.
Figure 15:
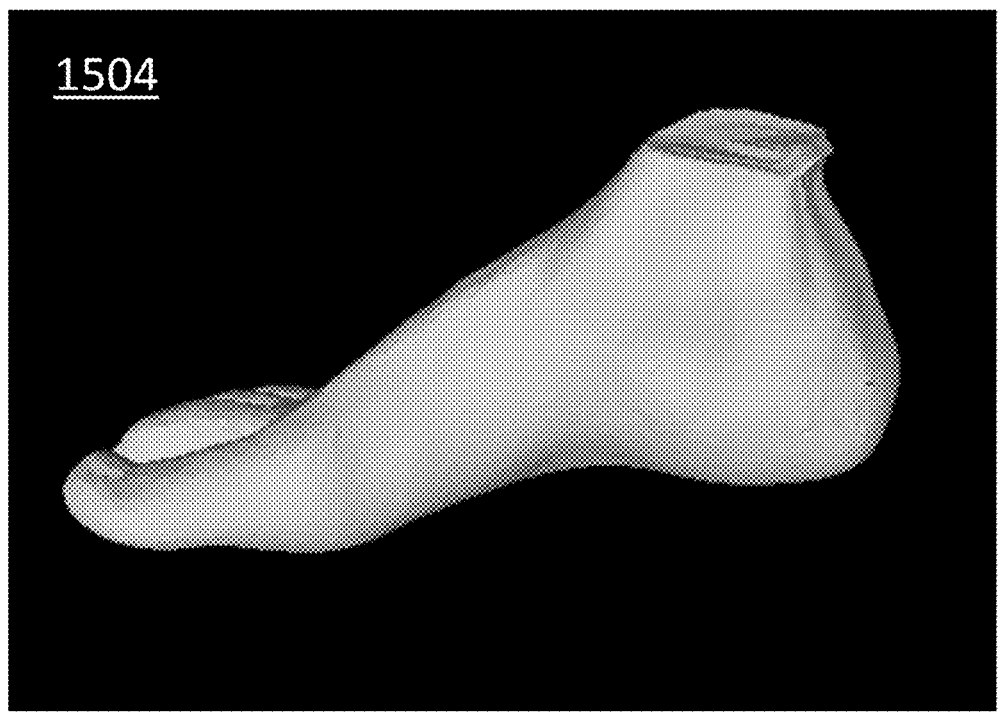

FIG. 15 illustrates a second example of a second 3D model template in a first version 1502, prior to being morphed in accordance with the method 600. FIG. 15 also illustrates the second 3D model template in a second version 1504, after having been morphed and defining a second 3D representation of the foot captured by a 3D point cloud representation, in accordance with the method 600.

Figure 16:
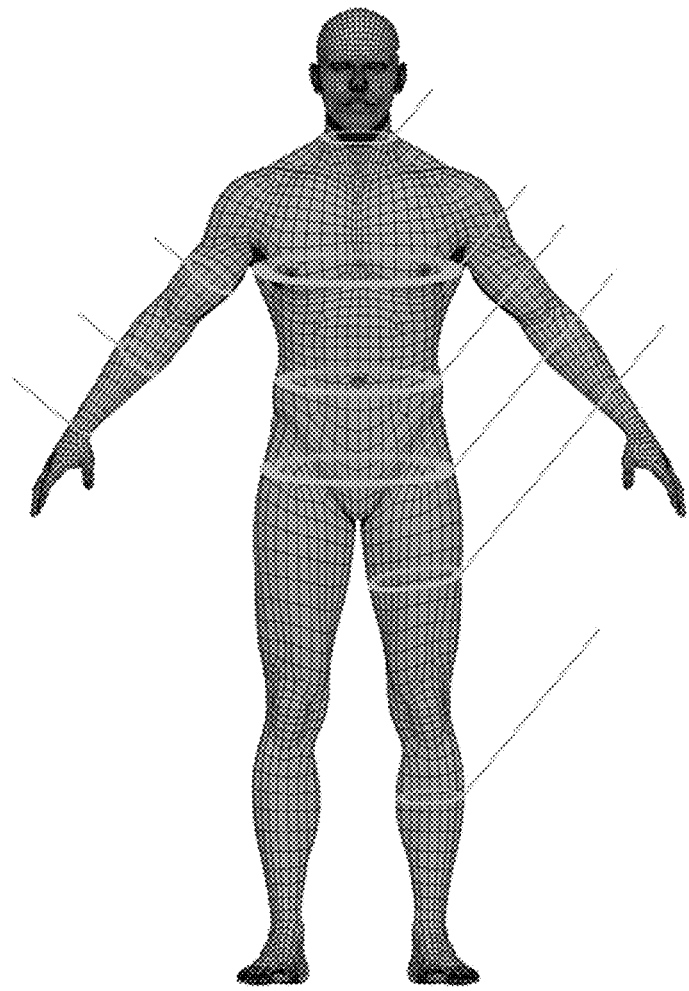
FIG. 16 illustrates another example of context for applying the present technology.

Turning now to FIG. 16, another example of context for applying the method 600 is depicted. In this example, the method 600 is executed for the purpose of body sizing. In such context, the body 1602 illustrated at FIG. 16 may be considered as a collection of rigid objects connected together through geometrical graphs. The method 600 may be applied to each one of the rigid objects defining the body and then each one of the rigid objects may be combined to generate a 3D representation of a complete body. In some embodiments, a collection of fixed rigid object may be considered as a rigid object—e.g. a whole arm from shoulder to fingers can be considered as a rigid object as long as it doesn't move. If it does, each part of the arm will have to be considered separately (arm/forearm/hand/fingers) and reassembled together to form a 3D representation of the body.

Figure 17:
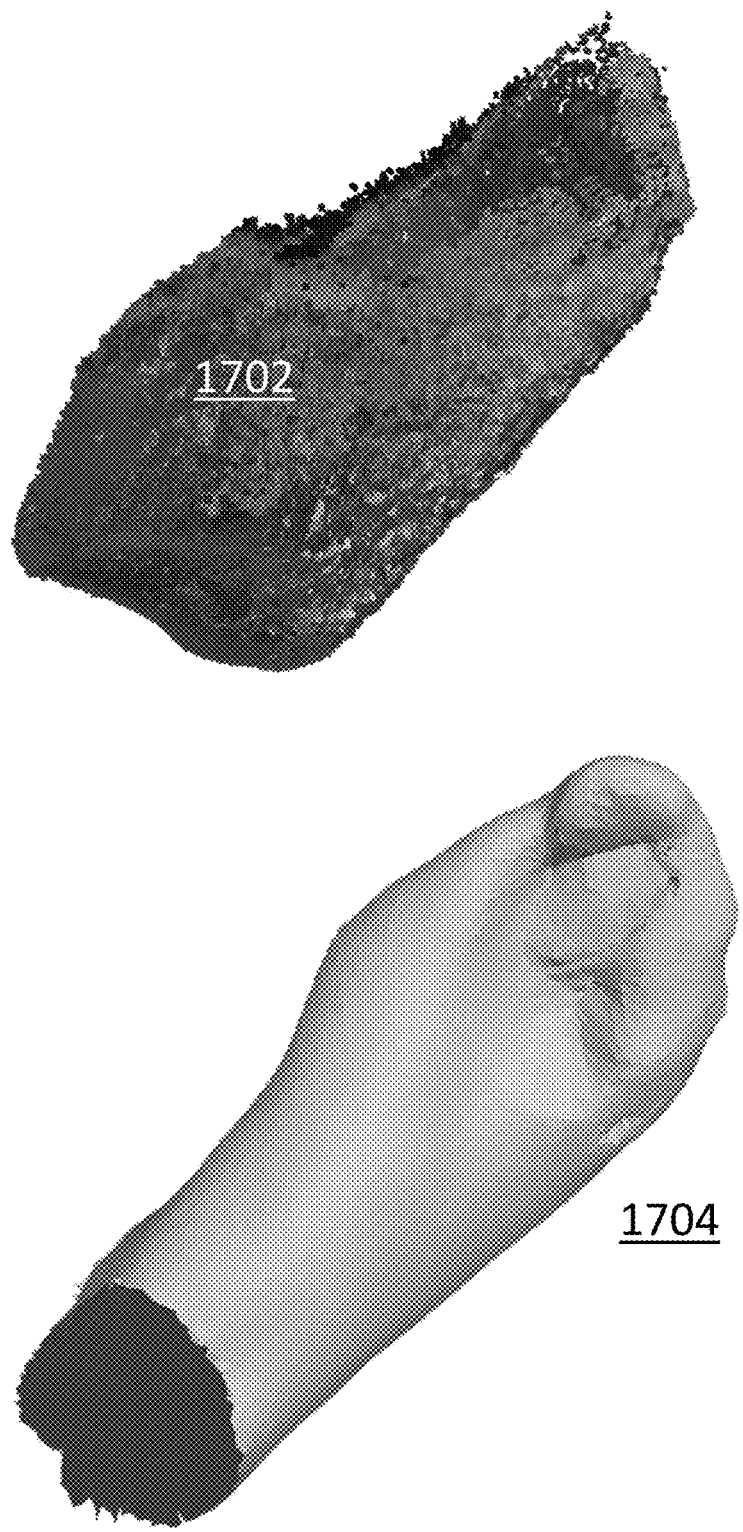
FIG. 17 illustrates a 3D point cloud reconstruction and a 3D representation generated from the 3D point cloud reconstruction in accordance with embodiments of the present technology.

Turning now to FIG. 17, a 3D point cloud reconstruction 1702 representing a foot and a 3D representation of the foot 1704 generated from the 3D point cloud reconstruction 1702 by applying the method 600 are illustrated. As it may be appreciated, the 3D point cloud reconstruction 1702 comprises reconstruction defects on a top portion of the foot. In the illustrated example, the top portion of the foot is missing. Such imperfect 3D point cloud reconstruction of an object may result from various causes, for example, but without being limitative, because a portion of an object is not accessible during the 3D point cloud acquisition step (e.g., a top portion of a foot cannot be accessed during the scanning, a portion of a screw is located within an assembly, etc.). As another example, defects in the 3D point cloud reconstruction of an object may result from the process of reconstructing the 3D point cloud reconstruction not having been properly executed. Imperfect 3D point cloud reconstructions, such as the 3D point cloud reconstruction 1702, are in contrast with "perfect" 3D point cloud reconstructions, such as the 3D point cloud reconstruction 402 illustrated at FIG. 4 which is complete, dense and uniform in terms of vertices distribution.

The 3D representation of the foot 1704 reflects the "poor quality" of the 3D point cloud reconstruction 1702 in that at least a portion of the foot (i.e., the toes and the top of the foot in the illustrated example) is not properly reconstructed.

Figure 19:
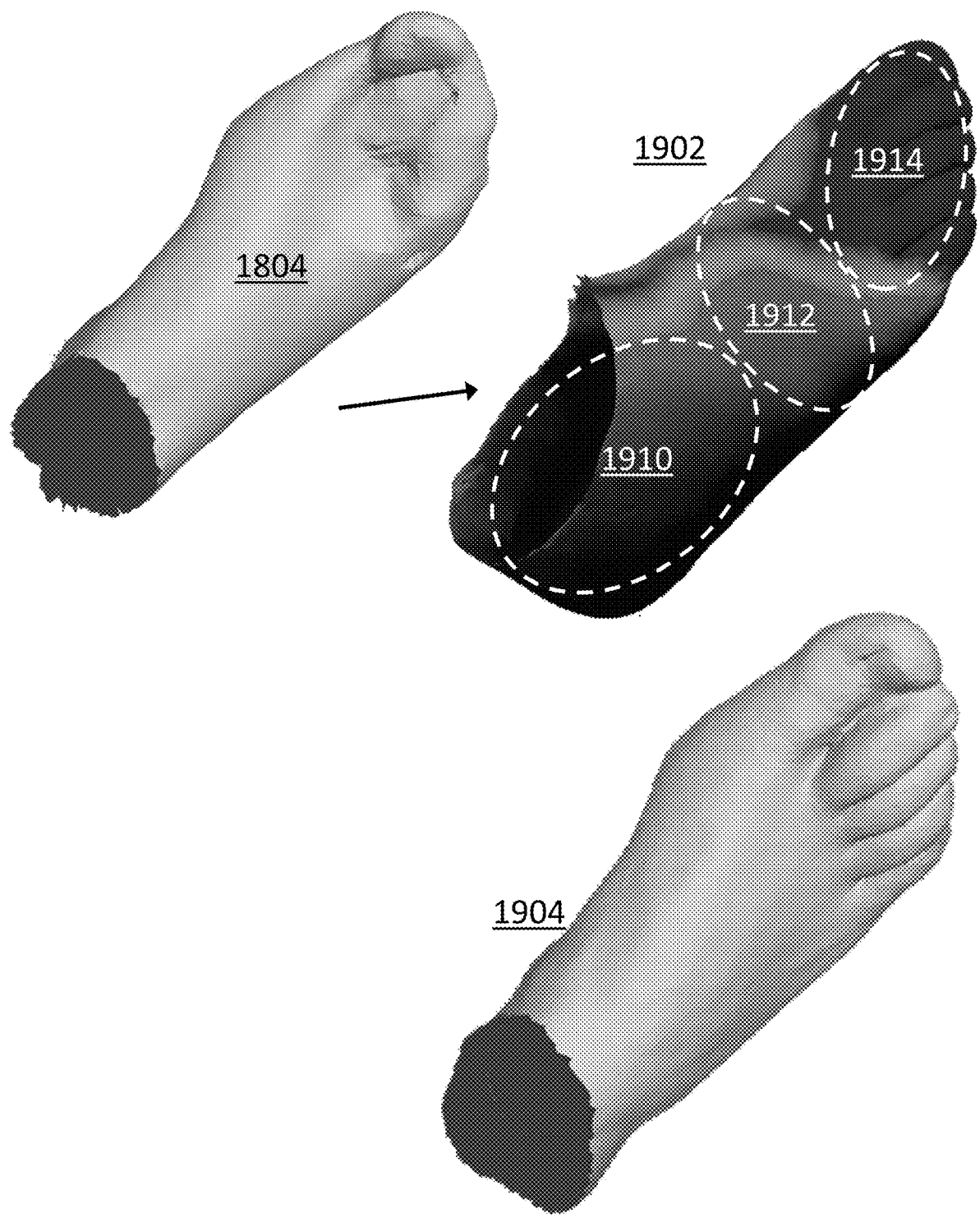
FIG. 19 illustrates an embodiment of steps for identifying parts to be corrected and parts after correction in accordance with embodiments of the present technology.
Figure 20:
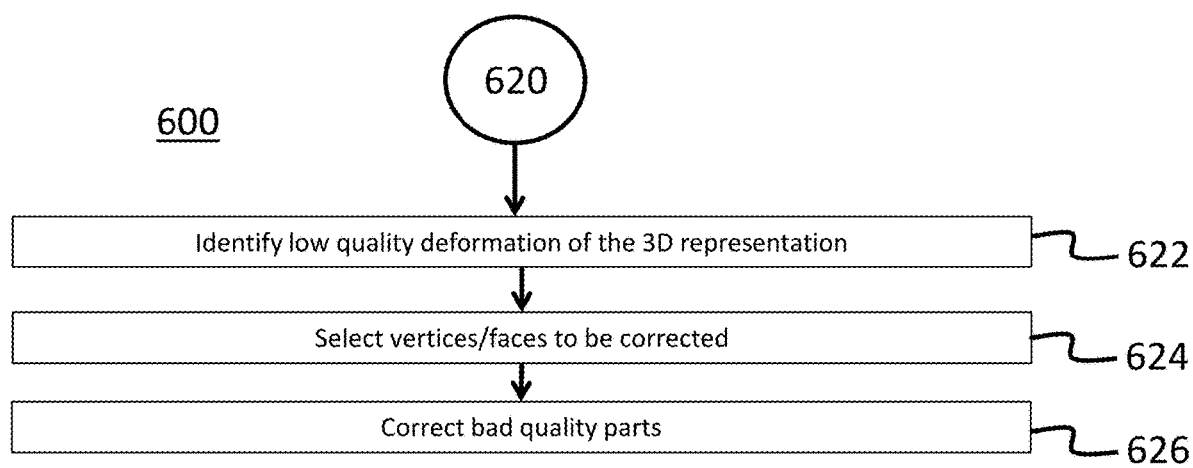
FIG. 20 is an illustration of additional steps of a method carried out in accordance with non-limiting embodiments of the present technology.

Turning to FIG. 19 and FIG. 20, an embodiment of steps 622-626 implementing corrective actions for the processing of an imperfect 3D point cloud reconstruction is exemplified. In some embodiments, the steps 622-626 may be part of the method 600. In some embodiments, the steps 622-626 may be executed after step 620.

Step 622 comprises identifying low quality deformation of the 3D representation. The 3D representation may have been generated in accordance with steps 602-620 based on an imperfect 3D cloud representation, for example the 3D cloud representation 1802. The low-quality deformation of the 3D representation may be identified by operating a quality function. In some embodiments, the quality function implements a comparison with a 3D model template. As it may be appreciated, an original 3D model template (i.e., a 3D model template not yet subjected to any deformation) and a deformed 3D model template (i.e., the 3D representation generated from the 3D model template) have a similar structure in terms of vertices and faces. It is thus possible to establish a correspondence between elements of the original 3D model template and elements of the deformed 3D model template, for example, but without being limitative, a correspondence between a vertex, a face and/or normal. In some embodiments, elements are each associated with an identifier (e.g., a number) thereby easing tracking of correspondences between elements.

In some embodiments, the quality function of step 622 may be based on two criteria, namely, a distance between two corresponding vertices and/or normal disparities between the original 3D model template and the deformed 3D model template. It should be understood that the quality function of step 622 may also be based on one of the two criteria without departing from the scope of the present technology.

Figure 18:
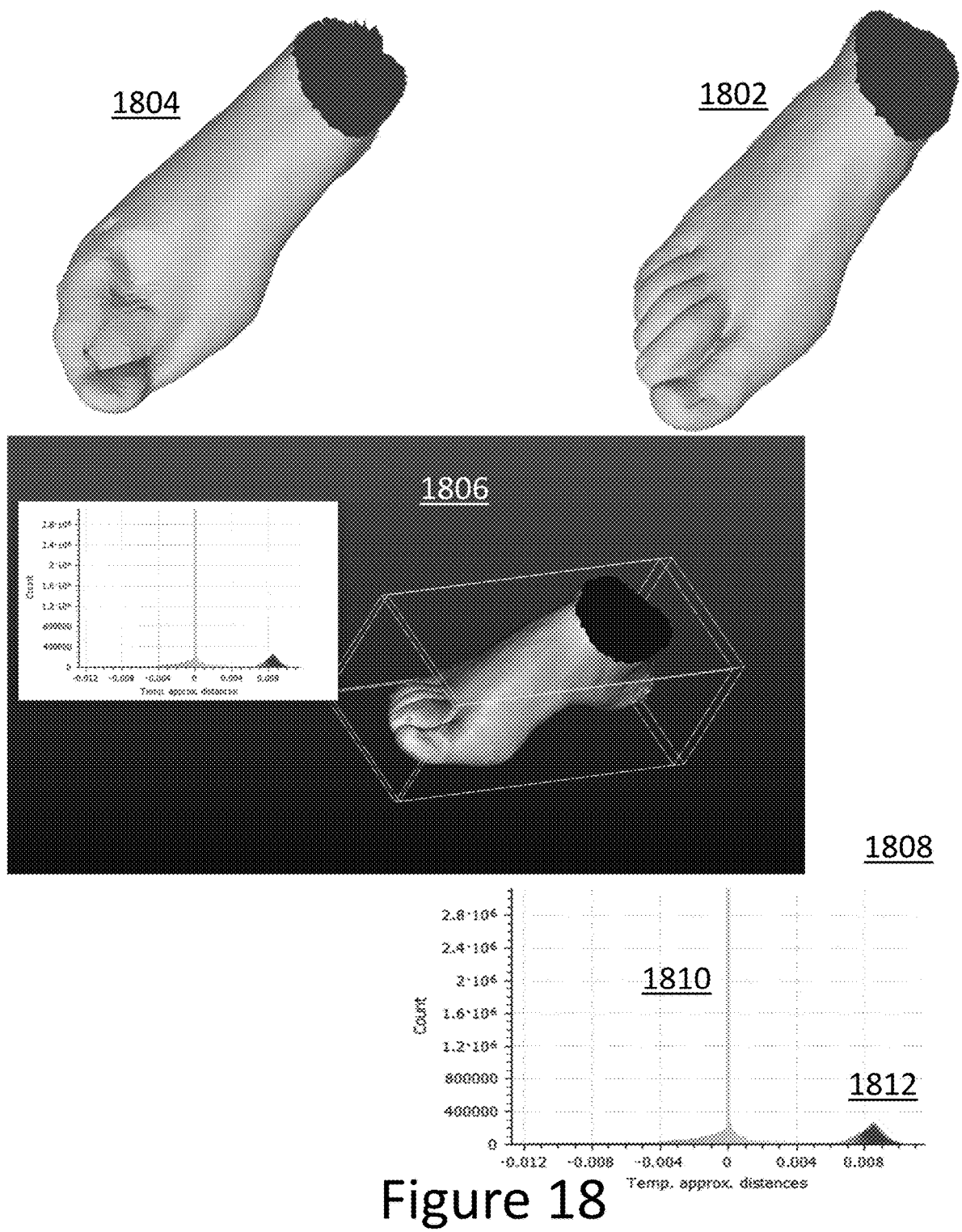
FIG. 18 illustrates quality measures for identifying parts to be corrected in accordance with embodiments of the present technology.

In some embodiments, the distance between two corresponding vertices establishes 3D distances between the original 3D model template and the deformed 3D model template. After the 3D point cloud reconstruction and the 3D model template have been aligned (at steps 606-614), 3D distances are supposedly minimal. If the 3D point cloud reconstruction reaches a certain quality threshold, 3D local deformations (equally referred to as "displacements") established at step 618 stays around a certain average plus standard deviation. If the 3D point cloud reconstruction is below a certain quality threshold, the 3D local deformations are over the standard deviation. An example of this quality measure is illustrated in FIG. 18, where the 3D model template is given at two different steps of the method 600; 1802 is given right after step 614 of the method 600 and 1804 after step 620 of the method 600. The distances between the corresponding vertices of those models whose structure has been kept the same (including number and indexes of vertices) is given on the 3D distance map 1806, as graph 1808 shows the distribution on those distances. Since applying method 600 will fit the 3D template model to a minimum distance besides parts that may not be seen, the distributions graphs will more or less have a same aspect, i.e. two peaks representing small 3D distances and/or good quality (1810) and big 3D distances and/or bad quality (1812). The vertices to be corrected by steps 622-626 of the method 600 may then be easily identified and a quality of the 3D representation may thus be considered as a function of distances distribution.

In some embodiments, the normal disparities between the original 3D model template and the deformed 3D model template may be established based on an angle between two corresponding normal of a vertex or a face. A low quality 3D representation (e.g., the 3D representation 1804) may result in a large angle between two corresponding normal. To the contrary, a good quality 3D representation may result in a small angle between two corresponding normals. Again, a 3D quality map may be displayed by computing a 3D map of the distribution of 3D normal angles between 3D models 1802 and 1804; the graph will have a similar aspect to graph 1808 and will allow the identification of vertices to be corrected. A quality of the 3D representation may thus be considered as a function of angles distribution.

Additional criteria may also be used in addition or in replacement of one or both criteria described above without departing from the scope of the technology.

Step 624 comprises automatically selecting low quality vertices and/or faces, considering the definition of quality as explained above. In some embodiments, step 624 may therefore rely on the distances distribution and/or the angles distribution established at step 622 to select the low quality vertices and/or faces. FIG. 19 illustrates a representation 1902 of areas 1910-1914 generated based on step 622 and used for the automatic selection executed at step 624. Area 1910 represents good quality parts, meaning that a distances distribution and/or an angles distribution between the original 3D model template and the deformed 3D model template is limited. To the contrary, area 1914 represents bad quality parts, meaning that a distances distribution and/or an angles distribution between the original 3D model template and the deformed 3D model template is above an acceptable threshold. Area 1912 establishes a transition area between good quality parts (i.e., area 1910) and bad quality parts (i.e., area 1914) of the 3D representation 1902. In some embodiments, the areas 1910-1914 may be color-coded, area 1910 being associated with a blue color, area 1914 being associated with a red color and area 1912 being a continuous color gradient from blue to red.

Step 626 comprises correcting bad quality parts based on the 3D model template. Step 626 may comprise weighting correction of bad quality parts. In some embodiments, step 626 comprises applying a synthetic deformation on vertices and/or faces of the bad quality parts identified at step 624 (e.g., area 1914) thereby reforming parts of the 3D model template corresponding to the bad quality parts. In some embodiments, the synthetic deformation is weighted by the quality function of step 622 thereby providing a smooth transition between the non-corrected and corrected parts. An example of steps 622-626 applied to the 3D reconstruction 1804 is illustrated by the corrected 3D reconstruction 1904 of FIG. 19.

As it may appreciated by the person skilled in the art of the present technology, the corrected parts of the 3D reconstruction may not perfectly fit reality but nonetheless allows generating a complete 3D reconstruction of an object as opposed to a partial 3D reconstruction with missing parts. It should also be understood that steps 622-626 may not be systemically applied, in particular if it established at step 620 or step 622 that the 3D reconstruction is complete enough and does not require corrections.

Notably, the features and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s) (including the contents of the documents cited and incorporated by reference herein), readily modify and/or adapt for various applications such specific embodiments, without undue experimentation and without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While the above-described implementations have been described and shown with reference to particular steps performed in a particular order, it will be understood that these steps may be combined, sub-divided, or re-ordered without departing from the teachings of the present technology. The steps may be executed in parallel or in series. Accordingly, the order and grouping of the steps is not a limitation of the present technology.

While various embodiments of the present disclosure have been described above, it should be understood that they have been presented by way of example, and not limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A method of generating a three-dimensional (3D) representation of a foot of a user, the method comprising:
    capturing data of the foot using one or more cameras;
    generating, based on the data of the foot, a 3D point cloud corresponding to the foot;
    retrieving a 3D model template of a generic human foot;
    generating the 3D representation of the foot by:
        aligning the 3D point cloud to the 3D model template using an iterative closest point (ICP) algorithm, and
        applying local deformations to a surface of the 3D model template by:
            determining a normal axis extending from a point of the 3D model template;
            determining a plurality of neighboring points located within a radius of the point of the 3D model template;
            determining a centroid of the plurality of neighboring points;
            displacing the point along the normal axis; and
            displacing the neighboring points based on a product of the normal axis and a vector linking a vertex to be displaced and the centroid; and
    determining, based on the 3D representation of the foot, measurement information of the foot.

2. The method of claim 1, wherein the measurement information comprises a length, height, depth, or width of the foot.

3. The method of claim 1, wherein the aligning the 3D point cloud to the 3D model template further comprises adjusting a scale of the 3D model template using the ICP algorithm.

4. The method of claim 1, wherein aligning the 3D point cloud to the 3D model template is performed iteratively and comprises:
    modifying a scale of the 3D model template, applying or refining a rotation to the 3D model template, or applying or refining a translation to the 3D model template; and
    calculating a distance between the 3D model template and the 3D point cloud.

5. The method of claim 1, wherein capturing the data of the foot comprises capturing images of the foot or a video of the foot.

6. The method of claim 1, wherein the one or more cameras are embedded in a mobile phone device.

7. The method of claim 1, further comprising selecting the 3D model template from a database of 3D models.

8. The method of claim 1, wherein the 3D model template comprises a 3D mesh model.

9. The method of claim 8, further comprising generating a 3D point cloud model template based on the 3D mesh model, and wherein aligning the 3D point cloud to the 3D model template comprises aligning the 3D point cloud to the 3D point cloud model template.

10. The method of claim 1, further comprising applying a denoising routine to the data of the foot.

11. The method of claim 1, wherein aligning the 3D point cloud to the 3D model template comprises:
    computing 2D pictures from the 3D model template in a combination of different points of view; and
    matching the 2D pictures to the different points of view.

12. A system comprising at least one processor and memory storing executable instructions which, when executed by the at least one processor, cause the system to:
    receive data of a foot captured using one or more cameras;
    generate, based on the data of the foot, a 3D point cloud corresponding to the foot;
    retrieve a 3D model template of a generic human foot;
    generate a 3D representation of the foot by:
        aligning the 3D point cloud to the 3D model template using an iterative closest point (ICP) algorithm to generate a 3D representation of the foot, and
        applying local deformations to a surface of the 3D model template by:
            determining a normal axis extending from a point of the 3D model template;
            determining a plurality of neighboring points located within a radius of the point of the 3D model template;
            determining a centroid of the plurality of neighboring points;
            displacing the point along the normal axis; and
            displacing the neighboring points based on a product of the normal axis and a vector linking a vertex to be displaced and the centroid; and
    determine, based on the 3D representation of the foot, measurement information of the foot.

13. The system of claim 12, wherein the measurement information comprises a length, height, depth, or width of the foot.

14. The system of claim 12, wherein the instructions that cause the system to align the 3D point cloud to the 3D model template comprise instructions that cause the system to adjust a scale of the 3D model template using the ICP algorithm.

15. The system of claim 12, wherein the instructions that cause the system to align the 3D point cloud to the 3D model template comprise instructions that cause the system to:
    modify a scale of the 3D model template, applying or refining a rotation to the 3D model template, or applying or refining a translation to the 3D model template; and
    calculate a distance between the 3D model template and the 3D point cloud.

16. The system of claim 12, wherein the 3D model template comprises a 3D mesh model, and the instructions further cause the system to generate a 3D point cloud model template based on the 3D mesh model, and wherein the instructions that cause the system to align the 3D point cloud to the 3D model template comprise instructions that cause the system to align the 3D point cloud to the 3D point cloud model template.

17. A non-transitory computer-readable medium comprising executable instructions which, when executed by at least one processor, cause the at least one processor to:
receive data of a foot captured using one or more cameras;
generate, based on the data of the foot, a 3D point cloud corresponding to the foot;
retrieve a 3D model template of a generic human foot;
generate a 3D representation of the foot by:
aligning the 3D point cloud to the 3D model template using an iterative closest point (ICP) algorithm to generate a 3D representation of the foot, and
applying local deformations to a surface of the 3D model template by:
determining a normal axis extending from a point of the 3D model template;
determining a plurality of neighboring points located within a radius of the point of the 3D model template;
determining a centroid of the plurality of neighboring points;
displacing the point along the normal axis; and
displacing the neighboring points based on a product of the normal axis and a vector linking a vertex to be displaced and the centroid; and
determine, based on the 3D representation of the foot, measurement information of the foot.

18. The non-transitory computer-readable medium of claim 17, wherein the measurement information comprises a length, height, depth, or width of the foot.

* * * * *